Patented Oct. 7, 1930

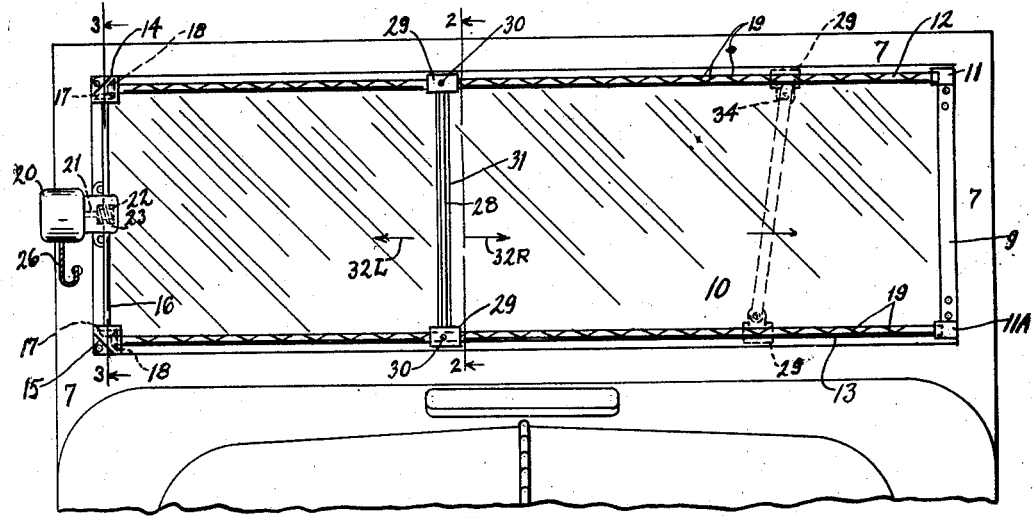

1,777,541

UNITED STATES PATENT OFFICE

JOHN W. ANDERSON, OF ST. PAUL, MINNESOTA

WINDSHIELD WIPER

Application filed July 17, 1929. Serial No. 378,966.

My invention relates to glass clearing devices more readily known as wind-shield wipers for automobiles though the usefulness of my device is not limited to wind-shields only.

The main object of my invention is to provide a simple and efficient wind-shield wiper which keeps the entire area of the wind-shield clear during rainy, snowy or otherwise inclement weather in which rain, snow or sleet is driven against the wind-shield as on an automobile.

This object I accomplish by the device hereinafter fully described and as illustrated in the accompanying drawing, in which,—

Fig. 1 is a front view of a one-piece windshield and adjacent parts of an automobile and illustrating my device in operative position.

Fig. 2 is a vertical sectional detail view in enlarged scale, taken as on line 2—2 in Fig. 1.

Fig. 3 is also a vertical sectional view in enlarged scale as on line 3—3 in Fig. 1, revealing the primary motor driven shaft and drive means for the parallel worm shaft of my device.

Fig. 4 is an enlarged vertical section on the same plane as Fig. 2 and showing a modified glass wiper construction.

Fig. 5 is an enlarged front view of the upper portion of Fig. 4, omitting showing of glass.

Fig. 6 is an enlarged sectional detail of a preferred wiper bar construction as on line 6—6 in Fig. 2.

Referring to the drawing by reference numerals, 7 designates the normally upright or slightly inclined stationary windshields holding frame of an automobile shown quadrangular and in the upper corners of which may be suitably hinged as at 8 (Figs. 2 and 3), the corresponding corners of the thus hinged windshield frame 9 retaining the glass windshield 10.

Describing my device as seen in Fig. 1, 11 and 11A are respectively upper and lower bearing members fixed on the upper and lower right side corners of the frame 9, their bearings being retained in parallel relation to receive respectively the ends of an upper worm shaft 12 and a lower worm shaft 13, said shafts being parallel to and outwardly of the upper and lower windshield frame bars 9.

14 and 15 are respectively upper and lower gear housings and bearing members fixed respectively at the upper and lower left corners of the windshield. These housings have vertically alined bores through which extend the end parts of a vertical drive shaft 16, having within each housing a bevel pinion 17 meshing with a bevel pinion 18 in each said housing and fixed on the end of shaft 12 or shaft 13 as the case may be. Rotation of shaft 16 causes the worm shafts 12—13 to rotate simultaneously. Said shafts 12—13 are provided with like continuous spiral grooves 19 from one end to the other of their exposed parts, the groove of each being right hand spiral one way and continued in the other direction as left hand spiral. Shaft 16 may be rotated by any suitable available power means, for example a light motor 20 mounted on or near the windshield and its axle 21 having a worm screw 22 meshing with a worm gear 23 on said shaft (see Figs. 1 and 3).

The motor receives current from the battery 24 through circuit wires 25 in a cable 26 extending to the motor, a switch 27 being in said circuit (Fig. 3). Other suitable power means rotating the worm 22 may be used.

28 is an upright rigid bar forward of and in a plane parallel to the glass 10. The ends of said bar are suitably fixed each to an actuating or traveling sleeve 29 reciprocable one on shaft 12 and the other on shaft 13, each sleeve having a screw 30 or equivalent engaging in the groove of its shaft 12—13. Thus when the shafts 12—13 rotate the sleeve 29 will be oscillated back and forth by the action of the grooves. The bar 28 has an integral or affixed web 28W extending toward the glass and on the part of said web adjacent the glass is removably fixed a glass contacting strip 31 of suitable material to best wipe the glass surface clean of rain, sleet or the like.

The bar 28 and its glass clearing strip 31 may be oscillated while in vertical position to right and left as indicated by arrows 32R—32L in Fig. 1, it being readily understood that sleeves 29 are started while in vertically spaced relation and the bar 28 connecting them rigidly. I have also provided for moving the wiper member 28—31 with its upper end in advance of the lower end during the windshield wiping action. This is done by simply mounting upper sleeve 29 on its shaft 12 ahead of the lower sleeve 29 and the bar 28 being made a little longer to properly connect the sleeves. In this case the bar 28 may be flat and provided with an elongated slot 33 engaging slidably a headed pin 34 on the upper sleeve 29. This slot compensates for the rocking action of bar 28 at both ends of its action movement.

It will be readily understood that upper sleeve 29 in this case will reach the end of the stroke either way, first, and start return movement before the lower sleeve 29 does. Thus the wiper is oscillated while in angular position with its upper sleeve in advance of the lower, this action helping to clear the window quicker and causing water on the glass to be moved downwardly more rapidly.

The use and construction of my improved windshield wiper has now been fully disclosed. Where conditions do not permit mounting of the motor, as shown, it may be mounted suitably anywhere near the drive shaft 16 and suitable power transmission means used to connect said parts to cause rotation of shaft 16. Obviously other power means available may be used to rotate the drive shaft. These and other mechanical expedients or equivalents may be embodied in the construction of my device without departing from the scope and spirit of the invention.

In some makes of motor vehicles their windshields comprise merely a quadrangular glass movable vertically into and out of a quadrangular frame but my device is of course applicable to such by being suitably mounted in a plane and forward of the plane of such glass that its wiper is equally efficient to the device as illustrated.

I claim:

A wiper for motor-vehicle wind-shields comprising a pair of vertically spaced parallel shafts arranged to be rotated simultaneously, one mounted near the upper edge of the wind-shield and the other mounted near the lower edge of the wind-shield, said shafts provided with spiral two-way grooves, a sleeve loosely mounted on each shaft and reciprocable thereon, means in each sleeve to engage the groove of its shaft, one sleeve normally above the other, a wiper bar connecting said sleeves and means thereon engaging the adjacent windshield surface, means for rotating said parallel shafts simultaneously to move the wiper bar across the face of the windshield, the upper of said two sleeves in a position in advance of the lower sleeve pertaining to the direction of movement of the wiper bar, and compensating means on one end part of the wiper bar comprising a slidable connection between the sleeve at said latter end of the wiper bar for the purpose set forth.

In testimony whereof I affix my signature.

JOHN W. ANDERSON.